(12) United States Patent
Hill et al.

(10) Patent No.: US 10,924,291 B2
(45) Date of Patent: *Feb. 16, 2021

(54) OVERLAY NETWORK BILLING

(71) Applicant: Oracle International Corporation, Redwood Shores, CA (US)

(72) Inventors: Peter John Hill, Seattle, WA (US); David Allen McArthur, Seattle, WA (US); Sushant Ajit Mantri, Bothell, WA (US); Amitkumar Chudasma, Lynnwood, WA (US); Michael Thomas Banatt, Westford, MA (US); Dale Raymond Worley, Waltham, MA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/730,960

(22) Filed: Dec. 30, 2019

(65) Prior Publication Data

US 2020/0136844 A1 Apr. 30, 2020

Related U.S. Application Data

(63) Continuation of application No. 15/908,474, filed on Feb. 28, 2018, now Pat. No. 10,523,450.

(51) Int. Cl.
  *H04L 12/14* (2006.01)
  *H04L 12/715* (2013.01)
  *H04L 29/08* (2006.01)

(52) U.S. Cl.
  CPC ...... *H04L 12/1403* (2013.01); *H04L 12/1425* (2013.01); *H04L 12/1435* (2013.01); *H04L 45/64* (2013.01); *H04L 67/10* (2013.01)

(58) Field of Classification Search
  CPC . H04L 12/1403; H04L 12/1435; H04L 45/64; H04L 12/1425; H04L 67/10
  See application file for complete search history.

(56) References Cited

U.S. PATENT DOCUMENTS

9,954,763 B1 * 4/2018 Ye .................. H04L 41/0813
2003/0142682 A1 * 7/2003 Bressoud ............ H04L 45/30
                                                    370/401

(Continued)

OTHER PUBLICATIONS

Chandra, R. et al. "BGP Communities Attribute." Request for Comments (RFC) 1997. The Internet Engineering Task Force. Aug. 1996.

(Continued)

*Primary Examiner* — Ajay Cattungal
(74) *Attorney, Agent, or Firm* — Invoke

(57) ABSTRACT

Operations include determining billing for data being transmitted out of an Autonomous System (AS). An internal node in the AS determines billing for a packet transmitted out of the AS based at least on an egress path of the packet. The packet is received at the internal node in the AS The internal node selects an egress path of the packet based on one or more characteristics of the packet. The egress path is mapped directly or indirectly to a billing counter. The billing counter is incremented based on (a) the transmission of the packet on the overlay network to the egress gateway and (b) transmission of the packet out of the AS on the selected egress path.

20 Claims, 8 Drawing Sheets

(56) References Cited

U.S. PATENT DOCUMENTS

| | | | |
|---|---|---|---|
| 2011/0134769 A1* | 6/2011 | Lee | H04L 45/125 370/252 |
| 2012/0195229 A1* | 8/2012 | Chen | H04L 45/12 370/254 |
| 2012/0201252 A1* | 8/2012 | Subramanian | H04L 45/125 370/401 |
| 2013/0077630 A1* | 3/2013 | Bejerano | H04L 45/50 370/392 |
| 2013/0117766 A1* | 5/2013 | Bax | G06F 9/4405 719/323 |
| 2013/0223454 A1* | 8/2013 | Dunbar | H04L 45/44 370/400 |
| 2015/0023150 A1* | 1/2015 | Chen | H04L 41/0668 370/217 |
| 2015/0163867 A1* | 6/2015 | Recker | H02J 9/02 315/250 |
| 2015/0263899 A1* | 9/2015 | Tubaltsev | H04L 45/02 370/254 |
| 2015/0350059 A1* | 12/2015 | Chunduri | H04L 45/124 370/238 |
| 2016/0020941 A1* | 1/2016 | Asati | H04L 45/24 370/228 |
| 2016/0248658 A1* | 8/2016 | Patel | H04L 45/127 |
| 2017/0019428 A1 | 1/2017 | Cohn | |
| 2018/0316520 A1* | 11/2018 | Wijnands | H04L 45/745 |
| 2019/0007225 A1* | 1/2019 | Nagarajan | H04L 12/185 |
| 2019/0104111 A1* | 4/2019 | Cidon | H04L 12/4641 |
| 2019/0104413 A1* | 4/2019 | Cidon | H04L 63/0272 |
| 2019/0158605 A1* | 5/2019 | Markuze | H04L 12/465 |

OTHER PUBLICATIONS

Cisco, "BGP Policy Accounting and BGP Policy Accounting Output Interface Accounting Features," Document ID: 13760, Dec. 29, 2005, 5 pages.

Dommety, G. "Key and Sequence Number Extensions to GRE." Request for Comments (RFC) 2890. The Internet Society. Sep. 2000.

Mahalingam, et al. "Virtual eXtensible Local Area Network (VXLAN): A Framework for Overlaying Virtualized Layer 2 Networks over Layer 3 Networks." Request for Comments (RFC) 7348. IETF Trust. Aug. 2014.

Rekhter, et al. "A Border Gateway Protocol 4 (BGP-4)." Request for Comments (RFC) 4271. The Internet Society. Jan. 2006.

Worster, T. et al. "Encapsulating MPLS in IP or Generic Routing Encapsulation (GRE)." Request for Comments (RFC) 4023. The Internet Society. Mar. 2005.

* cited by examiner

OVERLAY NETWORK BILLING

DISCLAIMER; INCORPORATION BY REFERENCE

The Applicant hereby rescinds any disclaimer of claim scope in the parent application(s) or the prosecution history thereof and advises the USPTO that the claims in this application may be broader than any claim in the parent application(s). Each of the following documents are hereby incorporated by reference:
  (a) Cohn, Dan, US Pat. App. Pub. No. 2017/0019428 A1, "Using Symmetric and Asymmetric Flow Response Paths from an Autonomous System." January 2017.
  (b) Rekhter, et al. "A Border Gateway Protocol 4 (BGP-4)." Request For Comments (RFC) 4271. The Internet Society. January 2006.
  (c) Mahalingam, et al. "Virtual eXtensible Local Area Network (VXLAN): A Framework for Overlaying Virtualized Layer 2 Networks over Layer 3 Networks." Request For Comments (RFC) 7348. IETF Trust. August 2014.
  (d) Worster, T. et al. "Encapsulating MPLS in IP or Generic Routing Encapsulation (GRE)." Request For Comments (RFC) 4023. The Internet Society. March 2005.
  (e) Dommety, G. "Key and Sequence Number Extensions to GRE." Request For Comments (RFC) 2890. The Internet Society. September 2000.
  (f) Chandra, R. et al. "BGP Communities Attribute." Request For Comments (RFC) 1997. The Internet Engineering Task Force. August 1996.
  (g) U.S. application Ser. No. 15/908,474 filed on Feb. 28, 2018

TECHNICAL FIELD

The present disclosure relates to autonomous systems. In particular, the present disclosure relates to determining billing for data being transmitted out of an autonomous system.

BACKGROUND

Internet routing architecture may be viewed as a set of domains, each domain having an internal routing environment. Each domain is a single administrative domain, operated within a uniform set of routing policies. Each domain may be operated independently from any other domain. The domain is in effect an autonomous unit in the overall routing architecture, and is termed an Autonomous System (AS). Each particular AS may appear, to other ASs, to have a single coherent internal routing plan. Each particular AS may present a consistent picture of what destinations are reachable through the particular AS. Each AS is uniquely identified using an Autonomous System Number (ASN). An ASN could be assigned, for example, to a network service provider (NSP), a large company, a university, a division of a company, or a group of companies.

The inter-domain routing environment describes how domains interconnect, but avoids the task of maintaining transit paths within each domain. In the inter-domain space, a routing path to an address is described as a sequence of domains that must be transited to reach the domain that originates that particular address prefix. Today this inter-domain space is maintained using Version 4 of the Border Gateway Protocol (BGPv4), RFC 4271.

Overlay networks are virtual network topologies implemented over physical network "substrates" (also referred to as underlay networks). Many overlay networks can execute on top of a single underlay network. An overlay network for each tenant, of a plurality of tenants, is isolated from overlay networks for other tenants.

A provider will often charge different billing amounts for different data transmissions. Data transmitted out of an AS may be billed differently based factors including the type of data transmitted, the cost to carry the data, and the quality of service associated with to the data. Billing is traditionally handled by creating traffic classification rules. The traffic classification rules are used to analyze data flow and determine the amount of transmitted data corresponding to a given traffic classification.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.
  1. GENERAL OVERVIEW
  2. ARCHITECTURAL OVERVIEW
  3. ENCAPSULATING AND DECAPSULATING PACKETS
  4. MAPPING DESTINATIONS TO BILLING COUNTERS
  5. DETERMINING BILLING FOR DATA TRANSMITTED OUT OF AN AS
     A. ASSIGNING BILLING CLASSIFICATION TAGS
     B. DETERMINING BILLING
  6. EXAMPLE EMBODIMENT
  7. MISCELLANEOUS; EXTENSIONS
  8. HARDWARE OVERVIEW

1. GENERAL OVERVIEW

One or more embodiments determine billing for data being transmitted out of an Autonomous System (AS). The data may be transmitted to various Internet addresses external to the AS, using various egress paths. As an example, an AS may include multiple different egress gateways to transmit data toward a same destination external to the AS. Different egress paths may identify different respective egress gateways of the AS. Different egress paths may be associated with different communication protocols, different encryption types, different intermediate nodes, and different latencies. The egress paths selected for transmissions to a particular destination may change based on changes in network topology and customer preference.

An internal node in the AS determines billing for a packet transmitted out of the AS based at least on an egress path of the packet. The packet is received at the internal node in the AS via a particular overlay network of a plurality of overlay networks. Each overlay network may be associated with a corresponding tenant of a set of tenants. The internal node selects an egress path of the packet based on one or more characteristics of the packet. As an example, the internal node may select the egress path based on packet destination, packet priority, packet sensitivity, or packet security. The egress path and the overlay network are mapped directly or indirectly to a billing counter. The egress path and the overlay network may be mapped to billing classification tag which is mapped to the billing counter. The billing classification tag may be implemented, for example, using a Border Gateway Protocol (BGP) community tag. A billing component may increment the billing counter based on an amount of transmitted data. For example, the billing counter may be incremented based on a number of bytes, a number of packets, or a number of messages associated with the billing counter.

One or more embodiments described in this Specification and/or recited in the claims may not be included in this General Overview section.

2. ARCHITECTURAL OVERVIEW

Figure 1A:
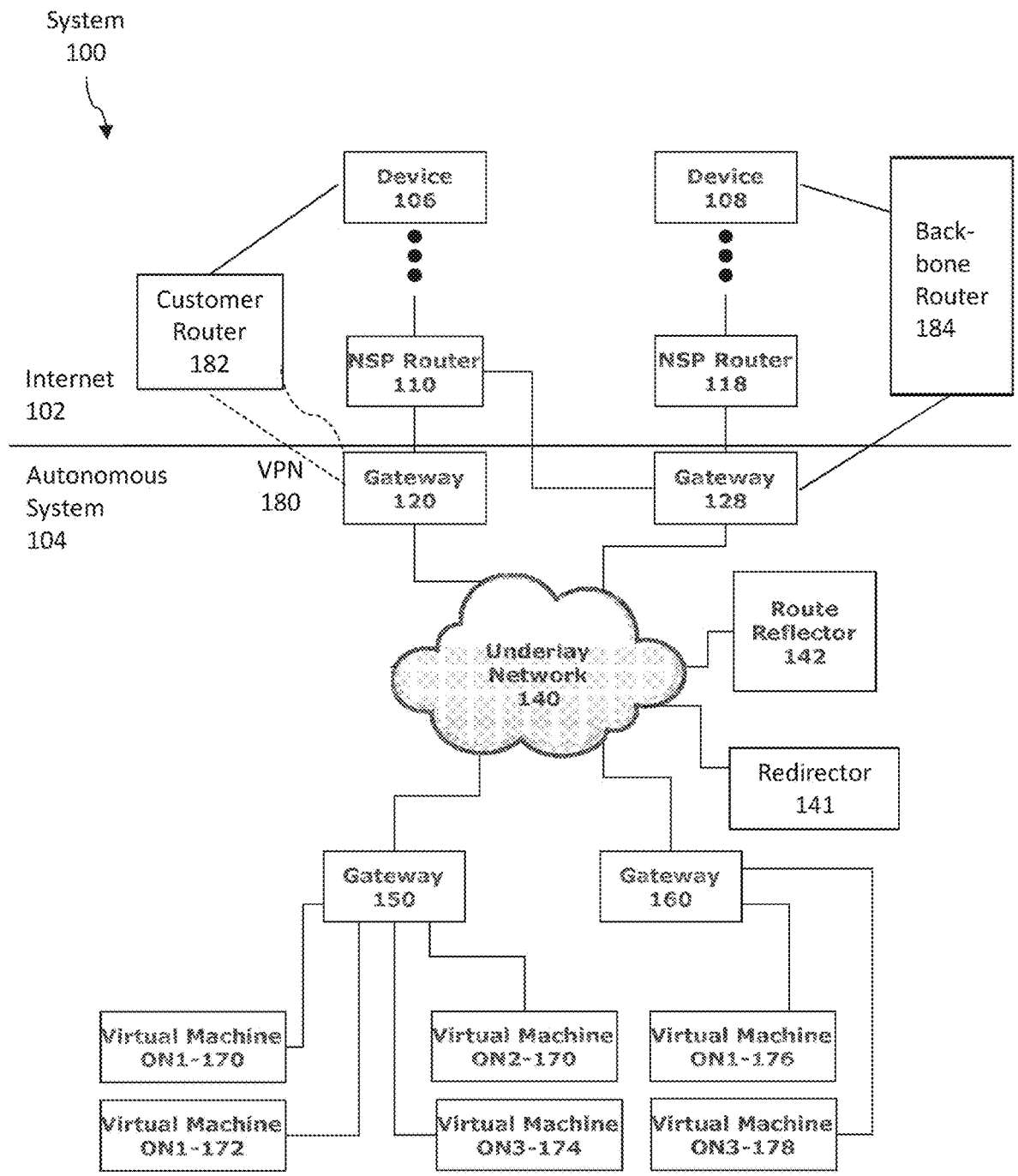
FIGS. 1A-1C illustrate a system in accordance with one or more embodiments.

FIG. 1A illustrates an example of a system 100 in accordance with one or more embodiments. Other embodiments may include more or fewer devices and more or fewer components than illustrated in system 100 and/or described below. Hardware components, software components, and/or functionality described as corresponding to one device may instead correspond to another device. Components illustrated separately may be combined into a single component or implemented on a single device. Accordingly, the scope of the claims should not be construed as being limited by the specific examples herein.

System 100 illustrates devices inside of AS 104 and devices on the Internet 102 that are external to AS 104. Devices within System 100 may be referred to as compute nodes or nodes. A compute node is any device that includes at least one hardware processor and functionality to execute operations using the hardware processor. A single compute node may concurrently execute multiple operating systems and/or applications. In this illustrative example, device 106, device 108, NSP Router 110, and NSP Router 118 are external to AS 104. Gateways 120, 128, 150, and 160 are inside AS 104. In addition, Route Reflector (RR) 142 and redirector 141 are implemented within AS 104. Virtual Machines (VMs) ON1-170, ON1-172, ON2-170, ON3-174, ON1-176, and ON3-178 are executed on compute nodes and are communicatively coupled with the gateways (which may be executed on the same or separate devices). Gateways and virtual machines may be implemented across various compute nodes without restriction. In one example, virtual machine ON1-170 is executed on a compute node that is reachable via gateway 150 being executed on a commodity router separate from the compute node. In another example, virtual machine ON2-170 and virtual machine ON3-174 are reachable via gateway 150 and executed on the same device as gateway 150.

In an embodiment, devices within AS 104 are connected by underlay network 140. Underlay network 140 is made up of networking devices such as switches, routers, and hubs. Routers within the underlay network 140 may be local routers/commodity routers that include functionality to determine a next hop toward a destination within AS 104. Some commodity routers do not have the functionality and/or processing power to compute a next hop based on destinations on the Internet 102. In one example, a commodity router routes an encapsulated packet to a gateway identified in the outer header of the encapsulated packet without identifying or using an inner header of an inner packet stored in the payload of the encapsulated packet. The encapsulation of the inner packet addressed to an Internet destination and the addressing of the encapsulated packet to a destination within AS 104 advantageously obviates the need of underlay network routers to route packets based on destinations on the Internet 102.

Underlay network 140 may be implemented using any routing protocol and device addressing scheme. In one example, which should not be construed as limiting the scope of the claims, underlay network 140 is an Open Systems Interconnection (OSI) Layer 3 network in which packets are forwarded toward destination Internet Protocol (IP) addresses included within packet headers. When a packet being forwarded is an encapsulated packet with an outer header corresponding to an outer packet and an inner header corresponding to an inner packet, the outer header is used to determine the next hop within underlay network 140.

Non-blocking performance in underlay network 140 may be achieved by connecting each gateway device (for example, gateway 120 and gateway 150) to every core device within underlay network 140 in a full-mesh topology. For example, gateway devices 120 and 150 and core devices within underlay network 140 may be arranged in a Clos or folded Clos (i.e., fat-tree) network topology, which allows underlay network 140 to be scaled using small, inexpensive devices with the performance and redundancy of larger, more expensive devices.

In an embodiment, AS 104 corresponds to a multi-tenant environment for storing data and executing operations for multiple tenants. AS 104 is configured to prevent a tenant from accessing data corresponding to other tenants. Tenant isolation within AS 104 is implemented using overlay networks. Each overlay network is a virtual network implemented over the underlay network 140. An overlay/virtual network for each tenant is isolated from overlay/virtual networks for other tenants. A node within the overlay/virtual network may communicate with another node within the overlay/virtual network each other using virtual tunnels (also referred to as "encapsulation tunnels").

RFC 7348 titled "Virtual eXtensible Local Area Network (VXLAN): A Framework for Overlaying Virtualized Layer 2 Networks over Layer 3 Networks" describes one example method for overlaying a virtual network over an underlay network. Specifically, RFC 7348 describes an example of a framework for overlaying a virtual Layer 2 network over an OSI Layer 3 network.

In another example, Generic Routing Encapsulation (GRE) protocol may be used as a framework for overlaying a virtual network over an underlay network. In this example, encapsulation and decapsulation for implementing virtual tunnels is executed in accordance with the GRE protocol (see for example, RFC 4023 and 2890). In another example, an OSI Layer 3 packet may be encapsulated within an outer Layer 3 packet for transmission across an underlay network.

Continuing with FIG. 1A, each overlay network is associated with a respective set of one or more virtual machines for storing data and executing operations. A particular tenant may access VMs on the overlay network corresponding to that particular tenant. However, that particular tenant is prevented from accessing VMs on overlay networks corresponding to other tenants. In the illustrated example, device 108 corresponds to a user device of a first tenant which is assigned an overlay network ON1. ON1 is associated with virtual machines ON1-170, ON1-172, and ON1-176. A second overlay network ON2 is associated with a virtual machine ON2-170. A third overlay network ON3 is associated with virtual machines ON3-174 and ON3-178.

A message may be transmitted to an entity associated with an overlay network by addressing the message to a device with an address in the underlay network 140 that is communicatively coupled to the entity in the overlay network. In an example, virtual machine ON1-170 is an entity in an overlay network ON1. A message addressed to an identifier "170" (overlay network address) in overlay network "ON1" is transmitted to the IP address (underlay network address) corresponding to gateway 150. Gateway 150 is communicatively coupled with virtual machine ON1-170 and may deliver the message to virtual machine ON1-170.

In this illustrative example, ON1-170 and ON2-170 have a same identifier ("170") but are differentiated based on the overlay network to which the respective VMs belong—ON1 and ON2, respectively. Messages addressed to identifier "170" are transmitted to ON1-170 if a source of the message is associated with ON1. Messages addressed to identifier "170" are transmitted to ON2-170 if a source of the message is associated with ON2. An identifier may correspond to a (Media Access Control) MAC address of a device. Multiple VMs may share the same MAC address (or other identifier) as long as the VMs are on different overlay networks.

Continuing with the illustrated example, device 108 is associated with a tenant assigned to ON1. Requests transmitted by device 108 are propagated through AS 104 to virtual machines associated with ON1. However, in the illustrated example, requests transmitted by device 108 to AS 104 are not propagated to virtual machines associated with ON2 or ON3.

In another example, a tenant may correspond to a particular business entity, BigCo Analytics. BigCo Analytics is a division of the company, BigCo. BigCo Analytics is associated with multiple user devices which are allowed to access data associated with BigCo Analytics. The data and related operations for BigCo Analytics are managed by a set of virtual machines on an overlay network assigned to BigCo Analytics. In this particular example, the user devices associated with BigCo Analytics are isolated from and prohibited from communicating with virtual machines on a second overlay network corresponding to another division of BigCo, BigCo Automotive. The user devices associated with BigCo Analytics are also isolated from and prohibited from communicating with virtual machines on a third overlay network corresponding to another tenant, WhiteAcre Properties (not affiliated with BigCo). While the above example relates to business entities, a tenant may simply correspond to an individual user, such as "Bob Smith".

Continuing with FIG. 1A, AS 104 includes a set of gateways. A gateway corresponds to a hardware and/or software component with functionality to forward packets. In an example, a gateway is a programmable Top-of-Rack (TOR) switch, within AS 104, that is physically connected to a set of compute nodes executing virtual machines. A gateway may execute one or more processing functions for received packets. Examples of processing functions include, but are not limited to, filtering packets, redirecting packets, translating packets (for example, Network Address Translation), encrypting packets, decrypting packets, encapsulating packets, and decapsulating packets.

In one embodiment, gateways within AS 104 include different components, different data sets, and/or different functionality. For example, a first set of gateways, including Gateway 120, include functionality for transmitting packets out of AS 104 toward destinations on the Internet (for example, device 106) and functionality for transmitting packets toward destinations within AS 104. Gateways that include functionality to transmit packets out of the AS 104 and directly to at least one device external to AS 104 are referred to herein as "egress gateways." The devices that are external to AS 104 and directly connected to at least one of the egress gateways of AS 104 are referred to herein as "logical peers" of AS 104. A logical peer may also refer to a business entity associated with the devices external to the AS 104 and directly connected to one of the egress gateways. The logical peers, on the Internet 102, are typically the first hop or first intermediate destination for packets being transmitted out of AS 104 toward a final destination on Internet 102. In the illustrative example, NSP router 110 corresponds to or is itself a logical peer of AS 104. Furthermore, NSP router 118 corresponds to or is itself a logical peer of AS 104. AS 104 may be connected to any number of logical peers.

A second set of gateways, including gateway 150, include functionality for transmitting packets toward destinations within AS 104 (as a final destination or an intermediate destination toward a final destination on the Internet) but do not have functionality to transmit a packet directly to a destination outside of AS 104.

Figure 1B:
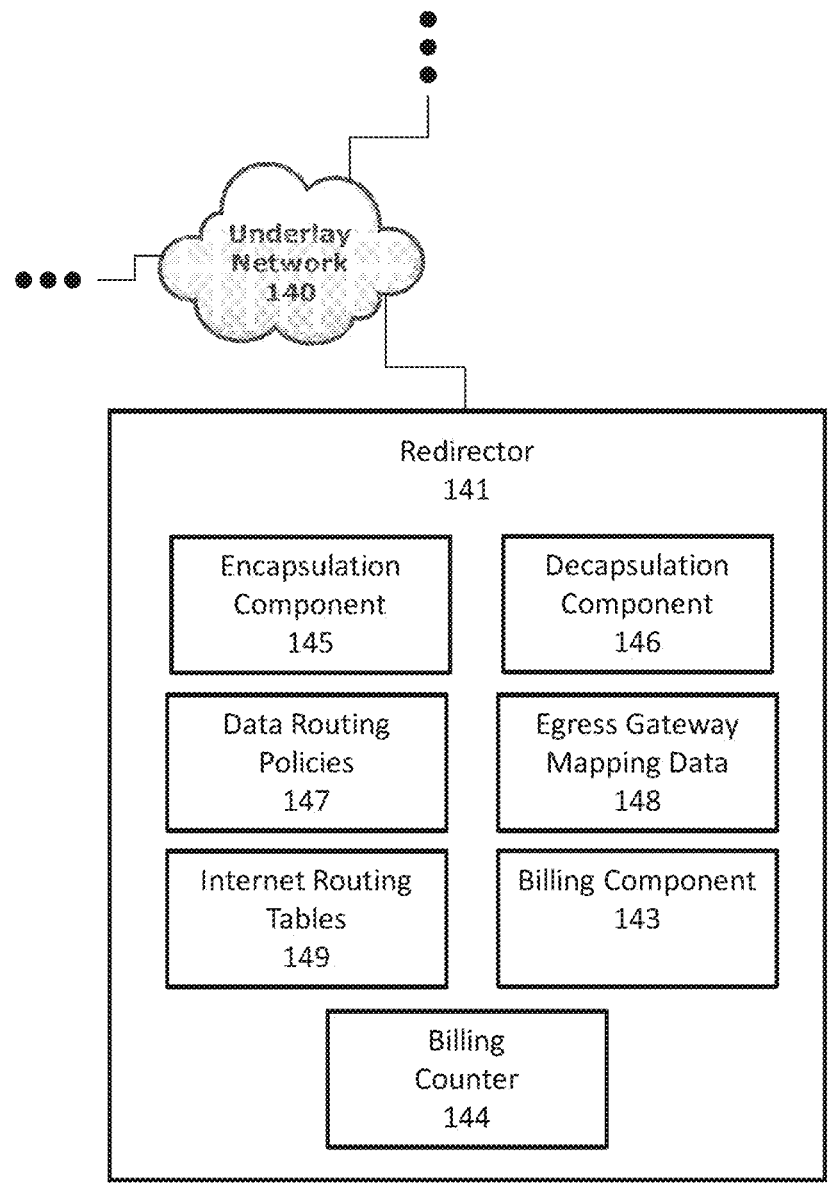

In one or more embodiments, the redirector 141 includes hardware and/or software with functionality to redirect packets propagating within AS 104 to egress gateways for transmission of the packets out of AS 104. An example set of operations for redirecting a packet propagating within AS 104 is described in detail in U.S. Pat. App. Pub. No. 2017/0019428 A1. Redirector 141 includes functionality to select an egress gateway based on one or more of: data routing policies 147, egress gateway mapping data 148, and Internet routing tables 149 (illustrated in FIG. 1B).

In an embodiment, data routing policies 147 identify logical peers to which outbound data is to be transmitted from AS 104. In an example, data routing policies 147 identify a logical peer for transmitting a set of one or more packets as a function of packet characteristics. Packet characteristics may include, but are not limited to, a final destination, a source device, a source entity, an associated tenant or business entity, a priority, required processing, a signature, and a security/confidentiality level. In one example, a high confidentiality level indicated in a packet requires handling by NSP xyz. The data routing policies identify a NSP router, corresponding to NSP xyz, as a logical peer to which packets with a high confidentiality level are to be transmitted.

In an embodiment, data routing policies 147 identify egress gateways of AS 104 connected to one or more logical peers of AS 104. In an example, data routing policies 147 identify a particular egress gateway for transmitting packets out of AS 104 as a function of a selected logical peer to which the packets are to be transmitted. The particular egress gateway is connected to the selected logical peer and accordingly, the particular egress gateway is suitable for transmitting a packet from AS 104 to the selected logical peer.

The data routing policies 147, illustrated in relation to redirector 141, may be stored on a same device as redirector 141 or on a separate device communicatively coupled to redirector 141. The data routing policies 147 may be generated by redirector 141 or received by redirector 141 from another device within AS 104 such as a controller (not shown) or a network management station (not shown). In one example, the data routing policies 147 for selecting a logical peer and mapping the selected logical peer to a particular egress gateway may be defined by an administrator. While data routing policies 147 are described herein with reference to redirector 141, data routing policies 147 may similarly be used by a gateway (e.g., gateway 150) to select an egress gateway.

In an embodiment, egress gateway mapping data 148 maps Internet addresses to specific egress gateways of AS 104. An egress gateway refers to a gateway through which a packet egresses out of AS 104 to a device on the Internet 102. In an example, egress gateway mapping data 148 maps gateway 120 to device 106. The mapping indicates that packets to be transmitted, by redirector 141 to device 106, may be transmitted from redirector 141 to gateway 120 for forwarding by gateway 120 to device 106.

Egress gateway mapping data 148 may be received, by redirector 141, from another device (for example, gateway 120, gateway 150, or RR 142). Alternatively, egress gateway mapping data 148 may be generated by the redirector 141 by snooping packets propagating within AS 104 that are received from an Internet address external to AS 104. In an example, snooping packets reveals a public IP address of an egress gateway at which a packet is received from a particular Internet address external to AS 104. The redirector 141 generates egress gateway mapping data 148 by mapping the egress gateway to the particular Internet address.

In an embodiment, Internet routing tables 149 include routes to or toward destinations on the Internet 102. Internet routing tables 129 may be referred to as Internet Virtual Routing and Forwarding (VRF) Forwarding Information Base (FIB). In one example, Internet routing tables 149 identify a path toward a destination on the Internet 102. Specifically, the Internet routing tables 149 identify an egress gateway of AS 104 that is on the path toward the destination on the Internet 102. The Internet routing tables 149 may include an Internet routing table for each tenant of a plurality of tenants. Each tenant's Internet routing tables may correspond to a particular overlay network.

Figure 3:
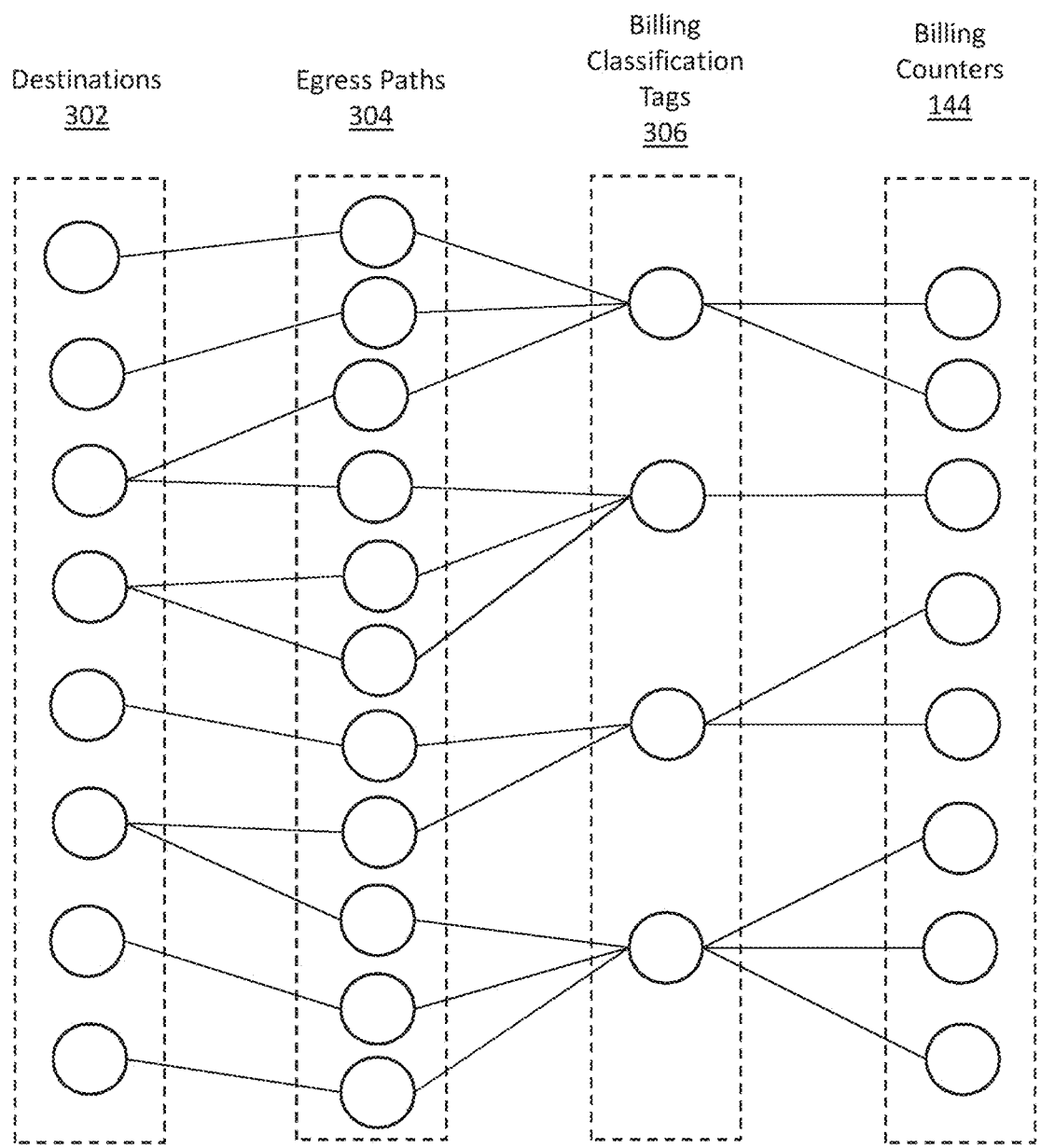
FIG. 3 illustrates example mappings in accordance with one or more embodiments.

A route, as specified in Internet routing tables 149, may correspond to an egress path 304 (illustrated in FIG. 3). Different egress paths 304 may be associated with different respective egress gateways of the AS (e.g., Gateway 120 or Gateway 128). Different egress paths may be associated with different communication protocols (e.g., File Transfer Protocol (FTP) or Hypertext Transfer Protocol (HTTP)). As an example, a particular egress gateway transmitting packets using a first communication protocol may be referred to herein as a first egress path. The same particular egress gateway transmitting packets using a different second protocol may be referred to herein as a second egress path. Different egress paths may be associated with different encryption types (e.g., encrypted or unencrypted). Different egress paths may be associated with different intermediate nodes (e.g. NSP Router 110 or NSP Router 118). Different egress paths may be associated with different latencies (e.g., normal latency or low latency).

In an embodiment, encapsulation component 145 and decapsulation component 146 are used for encapsulating packets and decapsulating packets, respectively. Encapsulation component 145 corresponds to software and/or hardware for encapsulating packets. Decapsulation component 146 corresponds to software and/or hardware for decapsulating packets. The process of encapsulating packets and decapsulating packets is described in detail below with respect to FIG. 2. In one example, redirector 141 uses the decapsulation component 146 to decapsulate packets propagating with AS 104, while redirector 141 uses the encapsulation component 145 to re-encapsulate the packets for transmission to a selected egress gateway. Inasmuch as the redirector 141 swaps the encapsulation, the redirector 141 may be referred to as an "encapsulation tunnel-swapping middlebox."

In an embodiment, a billing counter 144 is used for computing charges for data traffic associated with a respective billing classification tag. The counter is incremented as a function of the amount of traffic associated with the respective billing classification tag. The value of the counter and the applicable rate are used to compute the charge for a tenant. As an example, one billing counter may correspond to data transmitted via a first egress path and billed at rate a. Another billing counter may correspond to data transmitted via a second egress path and billed at rate b. Each tenant may be associated with a set of one or more billing counters. The charges corresponding to the billing counters associated with a tenant may be aggregated for billing to the tenant. The association between a tenant and a billing counter may be implemented via an association with the billing counter and an overlay network corresponding to the tenant. As an example, data transmitted via overlay network ON1 is billed to Company X. The system implements a first billing counter corresponding to data, transmitted via ON1, and billed to Company X at rate a. Data transmitted via overlay network ON2 is billed to Company Y. The system implements a second billing counter corresponding to data, transmitted via ON2, and billed to Company Y at rate b. The system implements a third billing counter corresponding to data, transmitted via ON2, and billed to Company Y at rate c.

In an embodiment, billing component 143 is hardware and/or software configured to manage a billing counter 144. Billing component 143 may increment a billing counter. Billing component 143 may generate a new billing counter 144. Billing component 143 may further include functionality to transmit a counter value associated a billing counter 144 to other devices inside or outside of the AS.

In an embodiment, the billing component 143 and billing counter 144 may be implemented on the redirector 141, or separately from the redirector 141. The billing component 143 and billing counter 144 may be implemented on dedicated node. The billing component 143 may be implemented on an egress gateway (e.g., Gateway 120).

Figure 1C:
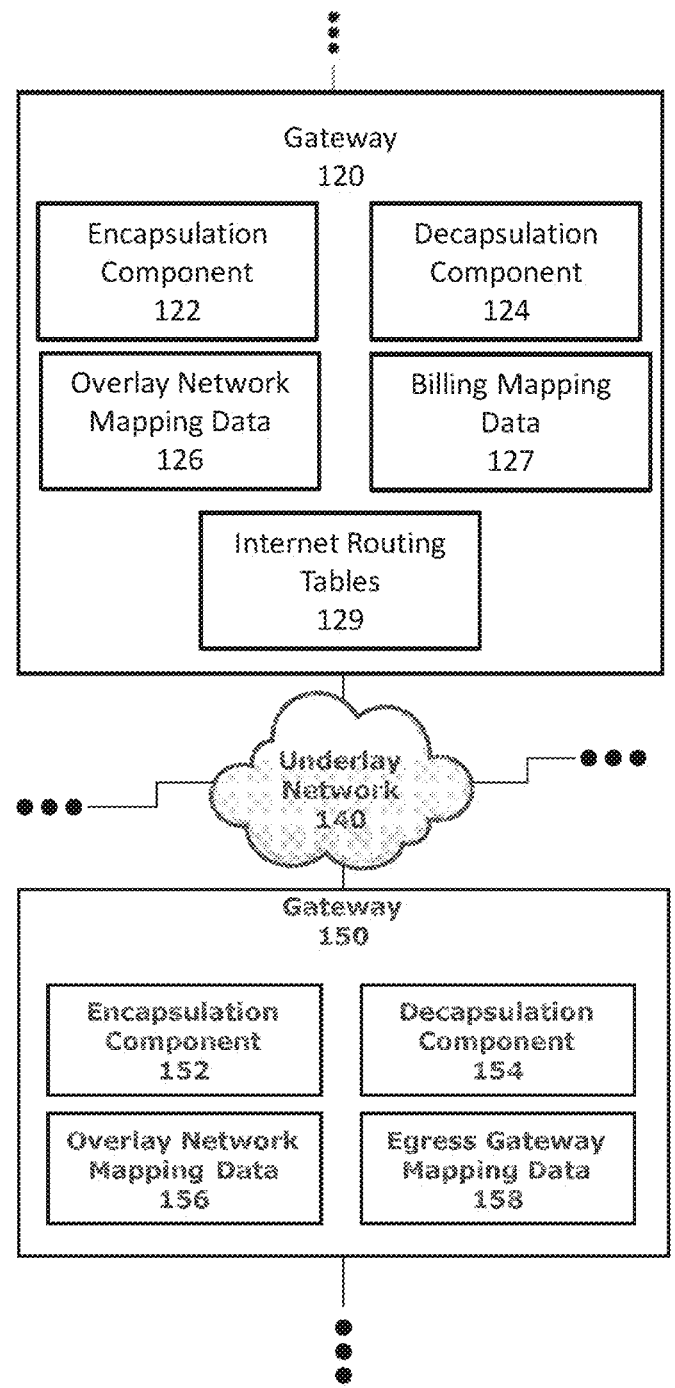

As illustrated in FIG. 1C, Gateway 120 stores Internet routing tables 129. Internet routing tables 129 include routing information corresponding to routes to or toward various destinations on the Internet. Internet routing tables 129 may be substantially similar to Internet routing tables 149 described with respect to redirector 141. Internet routing tables 129 may store the same number of routes, or more routes, than the Internet routing tables 149 stored to redirector 141.

Gateway 120 further includes functionality for transmitting packets toward destinations within AS 104. Packets transmitted by Gateway 120 within AS 104 via underlay network 140 are encapsulated using encapsulation component 122. Encapsulation component 122 and decapsulation component 124 are substantially similar to encapsulation component 145 and decapsulation component 146 described above with respect to redirector 141. Packets received by gateway 120 from sources within AS 104 via underlay network 140 are decapsulated using decapsulation component 124.

In an embodiment, gateway 120 stores overlay network mapping data 126. Overlay network mapping data 126 maps gateways to virtual machines that may be reached via the gateways. In an example, overlay network mapping data 126 maps virtual machine ON1-170 to gateway 150. The mapping is used to determine that packets to be transmitted to ON1-170 are to be transmitted to gateway 150 for forwarding by gateway 150 to ON1-170. The overlay network mapping data 126 further maps ON1-176 to gateway 160. The mapping is used to determine that packets to be transmitted to ON1-176 are to be transmitted to gateway 160 for forwarding by gateway 160 to ON1-176.

In an embodiment, gateway 120 stores billing mapping data 127. The billing mapping data 127 maps egress paths 304 directly or indirectly to billing counters 144. An indirect mapping may include billing classification tags 306 (illustrated in FIG. 3). A billing classification tag 306 is a signifier that may be added to routing information to specify a billing classification. Billing classification tags 306 and mappings thereof are described in detail below with respect to FIG. 3.

In an embodiment, gateway 120 includes functionality for adding a billing classification tag 306 to routing information corresponding to a particular egress path (also referred to herein as "tagging a route.") Gateway 120 may transmit the routing information, including the billing classification tag, to other nodes in the AS.

In an embodiment, gateway 150 is another gateway within AS 104 that is communicatively coupled with virtual machines (for example, virtual machines ON1-170, ON1-172, ON2-170, and ON3-174). Gateway 150 may correspond to any penultimate programmable node before an ultimate target destination of a packet. In an embodiment, gateway 150 corresponds to or implements a hypervisor or Virtual Machine Monitor (VMM) that creates and runs virtual machines. The device executing the hypervisor may be referred to as a host machine and each virtual machine may be referred to as a guest machine. The hypervisor and corresponding virtual machines may be executed on a same compute node.

In an embodiment, gateway 150 includes encapsulation component 152, decapsulation component 154, and overlay network mapping data 156, which may be substantially similar to above-described encapsulation component 122, decapsulation component 124, and overlay network mapping data 126, respectively. However, the overlay network mapping data 156 and the overlay network mapping data 126 do not necessarily include identical sets of mapping data.

In an embodiment, gateway 150 includes egress gateway mapping data 158. Egress gateway mapping data 158 maps destinations on the Internet 102 with a particular egress gateway that is to be used for transmitting data out of the AS 104 and toward the destinations on the Internet 102. Egress gateway mapping data 158 is substantially similar to egress gateway mapping data 148, described above.

Continuing with FIG. 1A, AS 104 includes RR 142 in accordance with one or more embodiments. RR 142 corresponds to a network routing component that receives and propagates routes within AS 104. RR 142 may be implemented on a dedicated device or any device within AS 104 that executes other functions. The routes propagated by RR 142 are used by various devices (for example, redirector 141) within AS 104 to transmit packets toward destinations within AS 104 (for example, via underlay network 140). In an embodiment, a separate instance of RR 142 is implemented for each overlay network within AS 104.

In an embodiment, a Network Service Provider (NSP) is a business or organization that transmits data between AS 104 and devices on the Internet 102. As an illustrative example, NSP router 110 transmits data from gateway 120 or gateway 128 toward device 106. NSP router 110 may also transmit data originating from device 106 to one of gateway 120 or gateway 128. Multiple NSPs may transmit data between AS 104 and Internet 102. Specifically, each NSP manages routers which forward data between AS 104 and devices on the Internet 102. Each NSP may assess a charge for data routed over the Internet via a router managed by the NSP.

In an embodiment, VPN 180 is a Virtual Private Network (VPN) connection. A VPN connection is a secure connection across public infrastructure such as the Internet. Data may be transmitted via VPN connection using a virtual tunneling protocol. Examples of virtual tunneling protocols include Internet Protocol security (IPSec), Point-to-Point Tunneling Protocol (PPTP), and Layer Two (2) Tunneling Protocol (L2TP). Additionally, or alternatively, data transmitted via a VPN connection may be encrypted. Due to the resources required to encrypt and/or tunnel data, traffic transmitted via VPN connection may be assessed a surcharge.

In an embodiment, customer router 182 is a router in a customer on-premise network. Traffic may be transmitted to a customer router 182 via a virtual tunnel. Traffic routed directly to a customer router 182 may correspond to a higher charge than traffic routed through the Internet via an NSP, due to the encryption resources required. Alternatively, traffic routed directly to a customer router 182 may correspond to a lower charge than traffic routed through the Internet via an NSP, due to the lack of NSP fees required.

In an embodiment, backbone router 184 (also referred to herein as an Internet backbone router) is a router used to connect autonomous systems on the Internet. Backbone routers 184 typically must handle thousands of processes from thousands of systems at a time. Accordingly, backbone routers have high processing ability and performance.

3. ENCAPSULATING AND DECAPSULATING PACKETS

In one or more embodiments, packets are transmitted between gateways (for example, gateway 120 and gateway 150). A transmitting gateway encapsulates the packet before transmission. A receiving gateway decapsulates the packet after receipt. In one example, gateway 120 selects gateway 150 as an egress node for transmission of a packet out of AS 104. By encapsulating the packet, gateway 120 hides the Internet destination of the packet. Gateway 120 advantageously ensures that (a) none of the intermediate nodes between gateway 120 and gateway 150 can modify the selection of the gateway 150 as an egress node and (b) none of the intermediate nodes require Internet routing tables for routing based on the Internet address hidden in the payload of the encapsulated packet.

Figure 2:
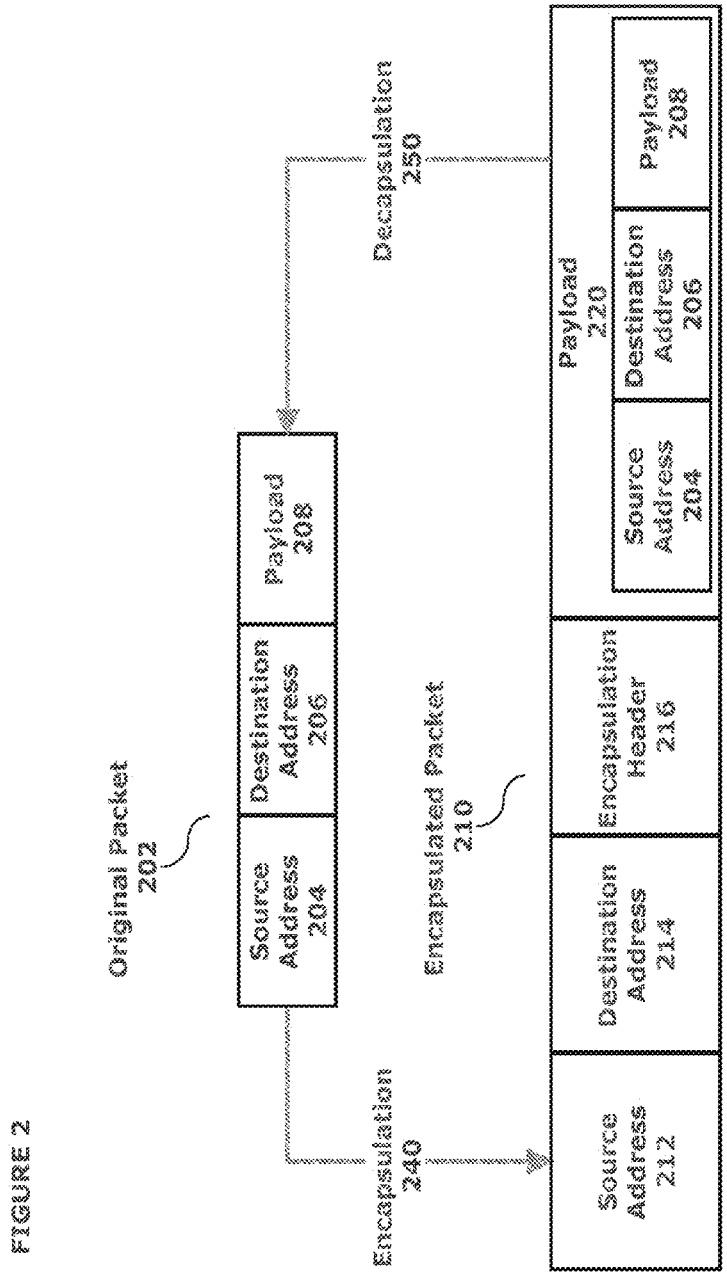
FIG. 2 illustrates encapsulating and decapsulating packets in accordance with one or more embodiments.

FIG. 2 illustrates the basic elements of an encapsulated packet and the basic elements of the original packet (or decapsulated packet) in accordance with one or more embodiments. The illustrated elements are selected for purposes of clarity and explanation. Embodiments may include more or fewer elements than the illustrated elements.

As illustrated in FIG. 2, an original packet 202 includes a source address 204, a destination address 206, and a payload 208. The source address 204 and destination address 206 are included in a portion of the packet 202 referred to as a packet header. The packet header is separate from the packet payload 208. A source address 204 identifies a source or sender of the packet. If the source address is an IP address, the source address is referred to herein as Source IP (SIP). In one example, a source address, of a packet transmitted from an AS to a device on the Internet, corresponds to the public IP address of a gateway at the edge of the AS that transmitted the packet out of the AS. However, an actual source of the packet is a virtual machine executing on a compute node inside of the AS.

A destination address 206 identifies a destination to which the packet is to be transmitted. The destination address 206 corresponds to a final destination of the packet or to an intermediate destination from which the packet is forwarded toward the final destination. In one example, once a packet is received at an intermediate device corresponding to the destination address 206, the intermediate device executes a Network Address Translation (NAT) to determine a final destination for the packet. The intermediate device modifies the destination field of the packet to the final destination, and forwards the packet to the final destination.

In an embodiment, original packet 202 includes a payload 208 corresponding to a cargo of a packet or data transmission. The data in original packet 202 may be aggregated, by a receiving device, with data in other packets to obtain a content item.

In an embodiment, encapsulation (Operation 240) is a process by which the original packet 202 is encapsulated within an outer packet. The original packet 202 is referred to as an inner packet encapsulated within the outer packet. Various different protocols may be used for encapsulating the packet including, for example, the VXLAN protocol and the GRE protocol referenced above. During the encapsulation process, one or more packet headers are added to the front of the original packet 202.

The resulting encapsulated packet 210 includes payload 220 with the original packet 202 and a new header(s). The header on the encapsulated packet 210 (referred to herein as an outer header) includes a source address 212 and a destination address 214. In an example, source address 212 corresponds to a SIP, while destination address 214 corresponds to a DIP. Source address 212 and destination address 214 are referred to herein as the outer source address and outer destination address, respectively. Source address 204 and destination address 206 are referred to herein as the inner source address and inner destination address, respectively.

In an embodiment, encapsulated packet 210 includes an encapsulation header 216 corresponding to an overlay network. The encapsulation header 216 includes an identifier corresponding to the overlay network and an identifier corresponding to the specific target entity on the overlay network. In one example, an encapsulation header includes Overlay Network Identifier "15" corresponding to a particular overlay network. The encapsulation header further includes a destination MAC address of the virtual machine that is the final destination for original packet 202 included within the payload of the particular encapsulated packet.

In an embodiment, decapsulation (Operation 250) is a process by which outer header(s) of the encapsulated packet 210 are stripped off to obtain the original packet 202. Decapsulating an encapsulated packet results in extracting the inner packet, i.e., original packet 202 from the payload 220 of the encapsulated packet 210.

In an embodiment, gateways (for example, gateways 120 and 150) use encapsulation to transmit packet through an underlay network. Specifically, the gateways serve as end points at which the encapsulation of packets and decapsulation of packets is executed. The gateways are also referred to as endpoints of an encapsulation tunnel or a virtual tunnel. In addition to the gateways, encapsulation and decapsulation is executed by a redirector.

4. MAPPING DESTINATIONS TO BILLING COUNTERS

FIG. 3 illustrates example mappings between destinations 302, egress paths 304, billing classification tags 306, and billing counters 308. The scope of the claims should not be construed as being limited by the specific examples herein.

In an embodiment, the destinations 302 are destinations external to the AS. Destinations 302 may include devices on a tenant's local on-premise network. Additionally, or alternatively, destinations 302 may include devices on a third-party network. In this example, eight destinations are included.

In an embodiment, the egress paths 304 correspond to routes toward destinations on the Internet. As described above with respect to FIG. 1B, egress paths may differ with different gateways of the AS, communication protocols, encryption types, intermediate nodes, and/or latencies. Accordingly, a single destination on the Internet may correspond to multiple egress paths. For example, as shown in FIG. 3, eight destinations on the Internet map to eleven respective egress paths.

In an embodiment, the billing classification tags 306 are used to track billing. A billing classification tag 306 may be stored in association with a particular route. When data is transmitted on the particular route, the billing classification tag is identified and mapped to a billing bucket. The billing bucket is incremented based on the data transmitted on the particular route.

As an example, a billing classification tag 306 may be implemented using a Border Gateway Protocol (BGP) community value. BGP community values are 32-bit values. Typically, a BGP community value is written as two 16-bit decimal numbers separated by a colon (e.g., 12345:123). A BGP community value can be configured with a user-friendly name, which maps a string to a BGP community value. A BGP community value may be used to pass routing information or preferences (as described in RFC 1997). An individual community value can be assigned to a single route or multiple routes. A route can be assigned a single community value or multiple values.

In an embodiment, an administrator may conceive of a set of communities corresponding to billing preferences for data being transmitted out of the AS. Different billing classifications may be established based, for example, on implementation costs. Implementation costs may vary based on factors such as whether data is encrypted, or whether low latency is needed. Implementation costs may vary based on a node in a route. As an example, the inclusion of a costly Internet backbone router in a route may increase implementation costs. Implementation costs may further vary based on whether source and destination routers connect directly, as opposed to via a third-party NSP which may assess additional charges.

As shown in FIG. 3, one or more egress paths 304 may map to a particular billing classification tag 306. Data routed via the one or more egress paths is billed in association with the billing classification tag. The amount of data is used to compute increment value for incrementing a counter corresponding to the billing classification tag.

As an example, data may be transmitted from two respective egress gateways to two respective backbone routers. The data may be transmitted on two different egress paths, but the egress paths are associated with the same tenant, of the same encryption type, and via the same router types. Accordingly, the same billing classification tag 306 is mapped to both of the egress paths.

In some embodiments, the same billing classification tag may be used across different tenants. The tenant counter may be determined as a function of (a) the billing classification tag and (b) the overlay network corresponding to a respective tenant. As an example, billing classification tag 12345:1 corresponds to a particular billing rate. Data with billing classification tag 12345:1, transmitted via Tenant A's overlay network ON1, corresponds to billing counter ON1-1 that is associated with tenant A and the particular billing rate. Data with billing classification tag 12345:1, transmitted via Tenant B's overlay network ON2, corresponds to billing counter ON2-1 that is associated with tenant B and the same particular billing rate.

5. DETERMINING BILLING FOR DATA TRANSMITTED OUT OF AN AS

A. Assigning Billing Classification Tags

Figure 4A:
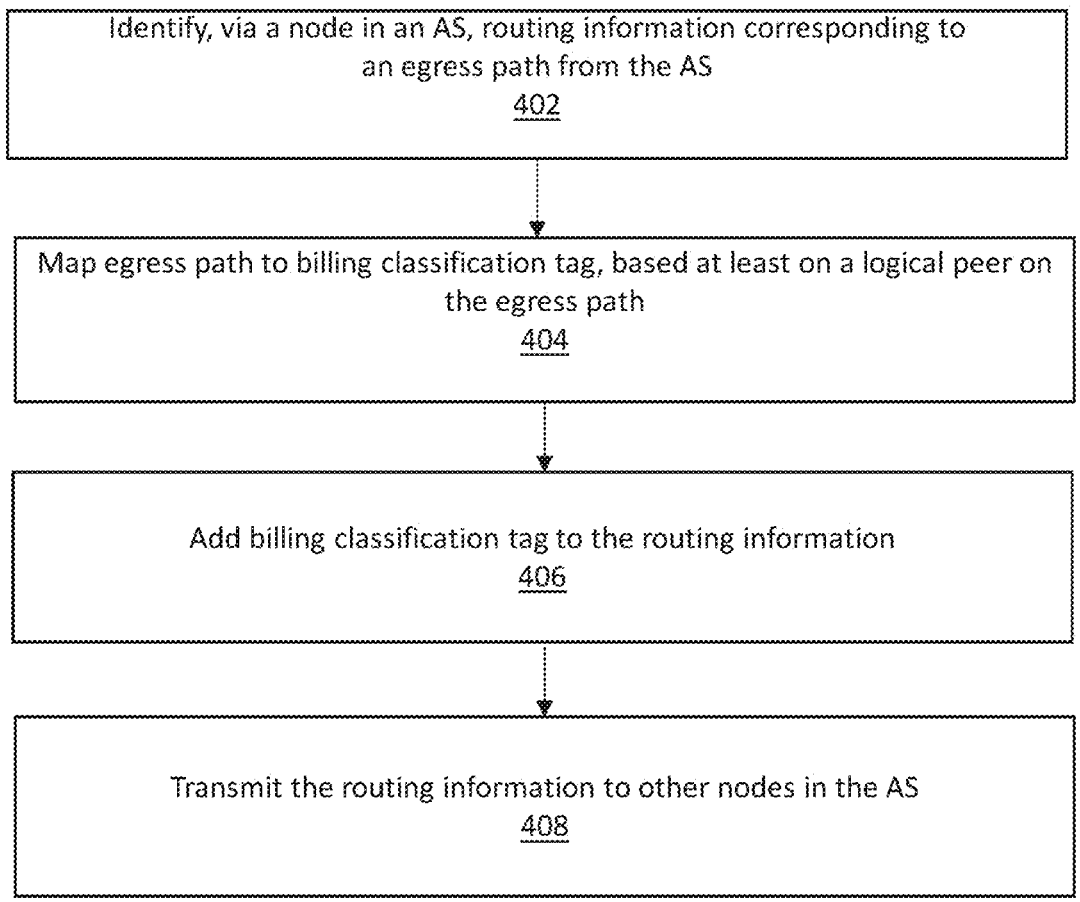
FIGS. 4A-4B illustrate operations for determining billing in accordance with one or more embodiments.

FIG. 4A illustrates an example set of operations for assigning a billing classification tag to an egress path in accordance with one or more embodiments. One or more operations illustrated in FIG. 4A may be modified, rearranged, or omitted altogether. Accordingly, the particular sequence of operations illustrated in FIG. 4A should not be construed as limiting the scope of one or more embodiments.

In an embodiment, a node in an AS identifies routing information corresponding to an egress path from the AS (Operation 402). A node in the AS, such as an egress gateway, may receive a routing announcement from a logical peer specifying the egress path. As an example, an egress gateway learns a route from a NSP router. The route learned from the NSP router is used to transmit Internet traffic via the NSP. As another example, a VPN client establishes a VPN tunnel with a customer router. The VPN tunnel is used to transmit VPN IPSec traffic. Alternatively, or additionally, a node in the AS may identify static routes stored to the node.

In an embodiment, the node maps the egress path to a billing classification tag (Operation 404). The mapping may be based, at least in part, on a logical peer on the egress path. As an example, for each route learned from NSP router 118, the node identifies a BGP community tag corresponding to a billing classification for Internet traffic.

Alternatively, the node may map the egress path directly to a billing counter (without a billing classification tag). A direct mapping to a billing counter may be further based on a particular overlay network. If the egress path and overlay network are directly mapped to a billing counter, then the system may update the billing counter accordingly (i.e., omit Operations 406, 408, 416, 418).

In an embodiment, the node adds the billing classification tag to the routing information (Operation 406). By adding the billing classification tag to the routing information, the node generates modified routing information. The node may, for example, modify the route preferences to assign a BGP community value to the route. Alternatively, the node may add the billing classification tag using a mechanism available under the routing protocol used.

In an embodiment, the node transmits the routing information to other nodes in the AS (Operation 408). The transmitted routing information is the modified routing information, which includes the billing classification tag. The node may publish the routing information to the RR. The RR may, in turn, share the routing information with the other nodes in the AS.

In an embodiment, a node, of the other nodes in the AS, updates one or more stored Internet routing tables, based on the modified routing information. As an example, responsive to receiving the modified routing information, the redirector updates a corresponding Internet routing table to include the billing classification tag.

B. Determining Billing

Figure 4B:
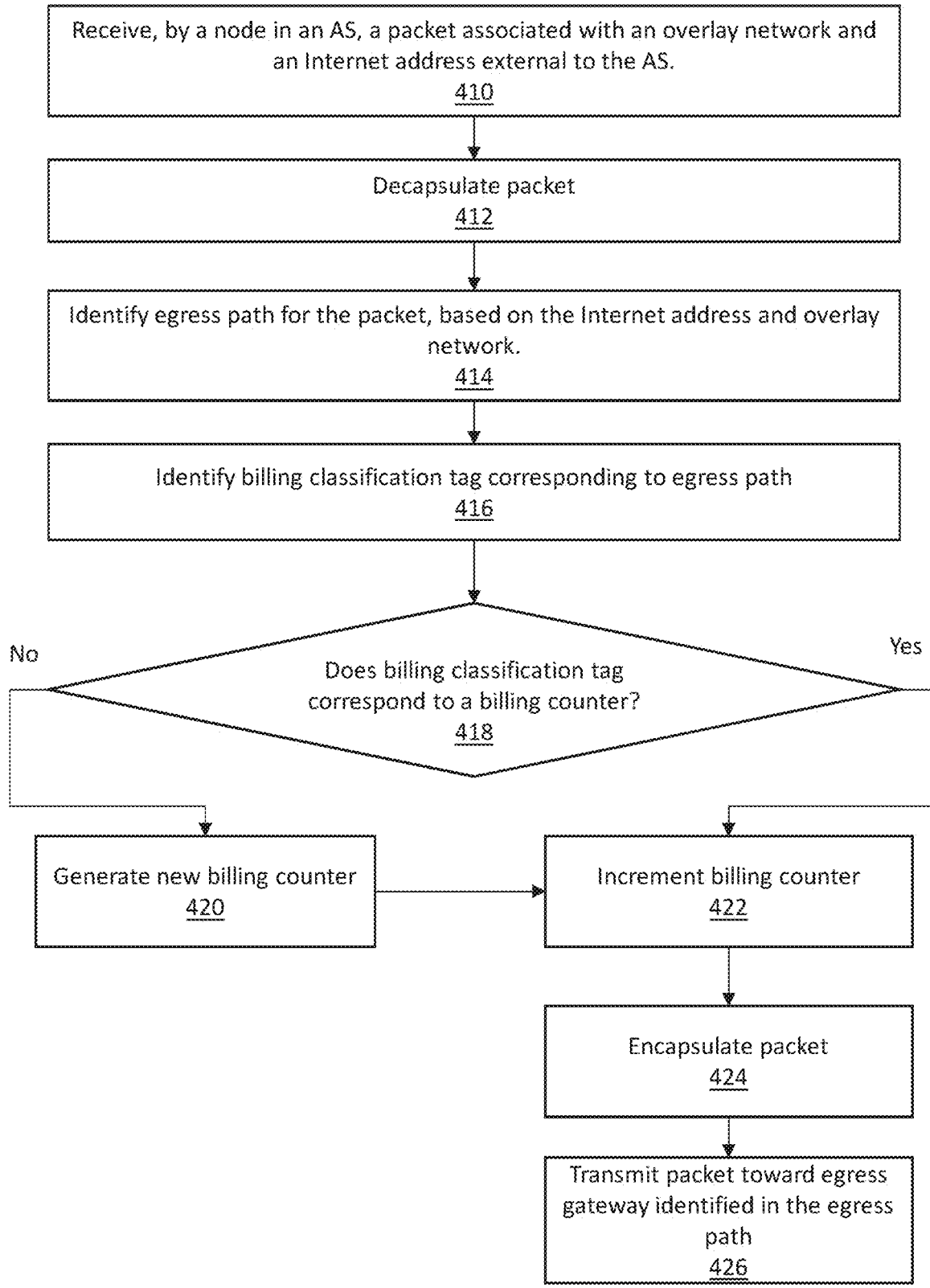

FIG. 4B illustrates an example set of operations for determining billing in accordance with one or more embodiments. One or more operations illustrated in FIG. 4B may be modified, rearranged, or omitted altogether. Accordingly, the particular sequence of operations illustrated in FIG. 4B should not be construed as limiting the scope of one or more embodiments.

In an embodiment, a node in the AS receives an encapsulated packet associated with an overlay network and an Internet address external to the AS (Operation 410). The node may receive an encapsulated packet from a gateway in the AS. Alternatively, or additionally, the node may receive an encapsulated packet from a VM in the AS.

In an embodiment, the node identifies the overlay network associated with the packet. The node may identify the overlay network based on an overlay network identifier in the encapsulation header. Alternatively, or additionally, determining the overlay network associated with the packet may include querying a database with one or more pieces of information within the packet to determine the particular overlay network associated with the packet. The pieces of information within the packet that may be used to determine the corresponding overlay network include, but are not limited to, a source IP address, a destination IP address, a source MAC address, a destination MAC address, an overlay network identifier, a session identifier, and an identifier of a physical port of ingress. As an example, a source IP address may be mapped to a tenant that is assigned to a particular overlay network.

In an embodiment, the node decapsulates the packet (Operation 412). The process of decapsulation is described above with respect to FIG. 2. The decapsulation process results in a decapsulated packet. The decapsulated packet may include a header specifying a source address and destination address.

In an embodiment, the node identifies a destination IP address. The node may identify a destination IP address within the decapsulated packet header. The destination IP address identified within the decapsulated packet header may correspond to the Internet address external to the AS. Alternatively, or additionally, the node may identify a destination IP address within the encapsulation header. The destination IP address identified within the encapsulation header may be a next-hop loopback IP address corresponding to an egress gateway in the AS. The destination IP address identified within the encapsulation header may correspond to a next hop towards the Internet address external to the AS. The node may identify the destination IP address within the encapsulation header after encapsulating the packet, as described below with respect to Operation 424.

In an embodiment, the node identifies an egress path for the packet, based on the Internet address and overlay network (Operation 414). Based on the overlay network, the node may identify a tenant-specific Internet routing table. The node may look up the destination Internet address in the Internet routing table. Based on the destination Internet address, the node may identify one or more potential egress paths for the packet. The node may select a particular egress path, of a plurality of potential egress paths identified in the Internet routing table.

Identifying the egress path may include identifying an egress gateway for egress of the packet from the AS and toward the destination Internet address. The egress path and/or egress gateway may be selected based on the locally or remotely stored data routing policies. Alternatively, or additionally, the egress path and/or egress gateway may be selected based on the locally or remotely stored Internet routing tables. The node may select a particular egress gateway for egress to improve a load balance across various egress gateways. The node may select a particular egress gateway based on errors associated with each of the egress gateways. Selecting a particular egress gateway is described in detail in US Pat. App. Pub. No. 2017/0019428 A1.

In an embodiment, the billing component identifies a billing classification tag corresponding to the egress path (Operation 416). The billing component may identify the billing classification tag via a stored Internet routing table. As an example, the node has selected a particular egress path corresponding to route 123456 in the Internet routing table. The Internet routing table includes detailed routing information corresponding to route 123456, including a billing classification tag. The billing component may, for example, identify a BGP community reserved for billing classification based on a prefix (e.g., 9 in the BGP community value 9:1).

In an embodiment, the billing component determines whether the billing classification tag corresponds to a billing counter (Operation 418). The billing component may have previously generated a billing counter corresponding to the billing classification tag. On the other hand, a corresponding billing counter may not yet exist. The billing component may search for a billing counter that maps to the billing classification tag to make the determination whether the corresponding billing counter exists.

In an embodiment, the billing counter may be incremented based on the egress path and overlay network, without the use of a billing classification tag. In lieu of Operations 416 and 418, the node may determine whether the egress path and overlay network map directly to a corresponding billing counter.

In an embodiment, the billing component generates a new billing counter (Operation 420). The billing component may generate the new billing counter by generating a data container corresponding to the appropriate billing classification. The billing component may store a mapping between the new billing counter and the corresponding billing classification tag. Generating the billing counter may include creating a namespace corresponding to a tenant identified based on the overlay network. Generating the billing counter may further comprise labeling an individual billing counter within the tenant namespace. Each namespace may contain a set of billing counters corresponding to the billing classifications pertinent to the particular overlay network.

The billing component may generate billing counters responsive to receiving packets, or responsive to receiving routing information. As an example of the former, the billing component receives a packet. The packet is destined for an egress path corresponding to a billing classification tag. The billing classification tag does not correspond to an existing billing counter. Accordingly, the billing component generates a new billing counter responsive to receiving the packet. As an example of the latter, the billing component receives (e.g., from the RR), routing information including a billing classification tag. The billing classification tag does not correspond to an existing billing counter. Accordingly, the billing component generates a new billing counter responsive to receiving the routing information.

In an embodiment, the billing component increments the billing counter (Operation 422). The billing component may increment the billing counter by one unit for each packet forwarded. Alternatively, or additionally, the billing component may increment the billing counter based on a number of bytes comprised in the packet. Incrementing the billing counter based on a number of bytes may include analyzing the packet to identify the number of bytes in the payload. Alternatively, or additionally, the billing component may increment the billing counter based on a number of messages associated with the billing counter.

In an embodiment, the node encapsulates the packet (Operation 424). The process of encapsulation is described above with respect to FIG. 2. Encapsulating the packet may include identifying an egress gateway, in the egress path, as a destination address of the outer header in the encapsulated packet. The encapsulated packet may further include metadata identifying a logical peer as a next hop from the egress gateway.

In an embodiment, the node transmits the packet toward the egress gateway identified in the egress path (Operation 426). The encapsulated packet may be transmitted from the node to the selected egress gateway via the overlay network, inasmuch as the node and the egress gateway are in the overlay network. Devices within the underlay network may route the re-encapsulated packet to the selected egress gateway.

In an embodiment, the node on the AS executing the operations described above with respect to FIG. 4B is a redirector, which includes the billing component. Using a redirector for billing is advantageous because the redirector collects up-to-date information about both the routes available and the packets forwarded. The redirector learns routes from the route reflector whenever a route is updated. Further, the redirector includes functionality to select routes based on stored data routing policies.

In an embodiment, the billing component transmits billing data for each billing counter to a tabulation component in the AS. The billing component may periodically publish the billing data to the tabulation component. Alternatively, or additionally, the tabulation component may pull the billing data from the billing component. Once the data has been accepted by the tabulation component, the billing component may delete local billing data to make room for new billing data.

In an embodiment, the tabulation component may aggregate billing data received from a set of billing components in the AS. The tabulation component may combine the billing data into summary billing tables. The tabulation component may compute a subtotal corresponding to a particular billing counter. As an example, the tabulation component may multiply a counter value associated with the billing counter by a rate associated with the billing counter to arrive at a charge corresponding to the billing counter. The tabulation component may add the subtotals for a set of billing counters to determine a total charge for a corresponding tenant.

6. EXAMPLE EMBODIMENT

The following detailed example illustrates operations in accordance with one or more embodiments. The following detailed example should not be construed as limiting the scope of any of the claims. Several routes, comprising respective egress paths out of the AS, are available. Each route can be characterized by an egress gateway and a logical peer as follows (with reference to the devices illustrated in FIG. 1A):

| Egress Gateway | Logical Peer |
| --- | --- |
| VPN 180 | Customer Router 182 |
| Gateway 120 | NSP Router 110 |
| Gateway 128 | NSP Router 118 |
| Gateway 128 | Backbone Router 184 |

Customer Router 182 transmits routing information to a VPN client associated with VPN 180 using BGP. The VPN client learns the routing information, which specifies an egress path via Customer Router 182. Based on the egress path, the VPN client places a BGP community on the route, by setting policy options on the route. The VPN client sets a community, VPN-IPSEC, with members 12345:1. 12345 indicates that the community corresponds to a billing community. 1 indicates a particular billing classification.

Gateway 120 uses static routes configured on Gateway 120 to identify routing information, characterizing an egress path via NSP router 110. Based on the egress path, Gateway 120 places a BGP community on the route. The community is INTERNET-TRANSIT, with members 12345:100. 12345 indicates that the community corresponds to a billing community. 100 indicates a particular billing classification.

Gateway 128 identifies two potential routes to two respective logical peers, NSP Router 118 and Backbone Router 184. Gateway 128 places a BGP community on the route via NSP router 118. The community is INTERNET-TRANSIT, with members 12345:100. 12345 indicates that the community corresponds to a billing community. 100 indicates a particular billing classification. Gateway 128 places a different BGP community on the route via Backbone Router 184. The community is BACKBONE, with members 12345: 200. 12345 indicates that the community corresponds to a billing community. 200 indicates a particular billing classification.

Each egress path is now associated with a corresponding BGP community as follows:

| Egress Gateway | Logical Peer | Community Name | Community Value |
| --- | --- | --- | --- |
| VPN 180 | Customer Router 182 | VPN-IPSEC | 12345:1 |
| Gateway 120 | NSP Router 110 | INTERNET-TRANSIT | 12345:100 |
| Gateway 128 | NSP Router 118 | INTERNET-TRANSIT | 12345:100 |
| Gateway 128 | Backbone Router 184 | BACKBONE | 12345:200 |

Subsequent to placing the BGP community tags on the routes, each of the egress gateways transmits the routing information to a route reflector in the AS. The route reflector learns the routing information. The route reflector transmits the routing information to other nodes in the AS. In particular, the route reflector transmits the routing information learned from an advertising edge router to all other edge routers, excluding the advertising edge router. The route reflector further transmits the routing information to a redirector in the AS.

The redirector receives routing information characterizing many egress paths from the route reflector. Some of the routing information includes communities that are tagged with a common prefix. In this case, the common prefix is 12345, signifying billing classification tags. The redirector creates a billing counter, for each overlay network, for each community for which the redirector has learned a corresponding egress path.

When a packet from a VM in the AS (e.g., VM ON1-170) is directed towards a destination on the Internet, the packet is transmitted to the redirector. Upon receiving a packet, the redirector identifies the overlay network and destination IP address within the packet. Based on the overlay network and destination IP address, the redirector identifies an egress path via the route table stored on the redirector in the overlay network.

When the redirector executes a route lookup, to identify the egress path, the redirector further checks for a matching billing classification tag on the route. If a matching billing classification tag exists, the redirector increments the billing counter corresponding to the billing classification tag.

7. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
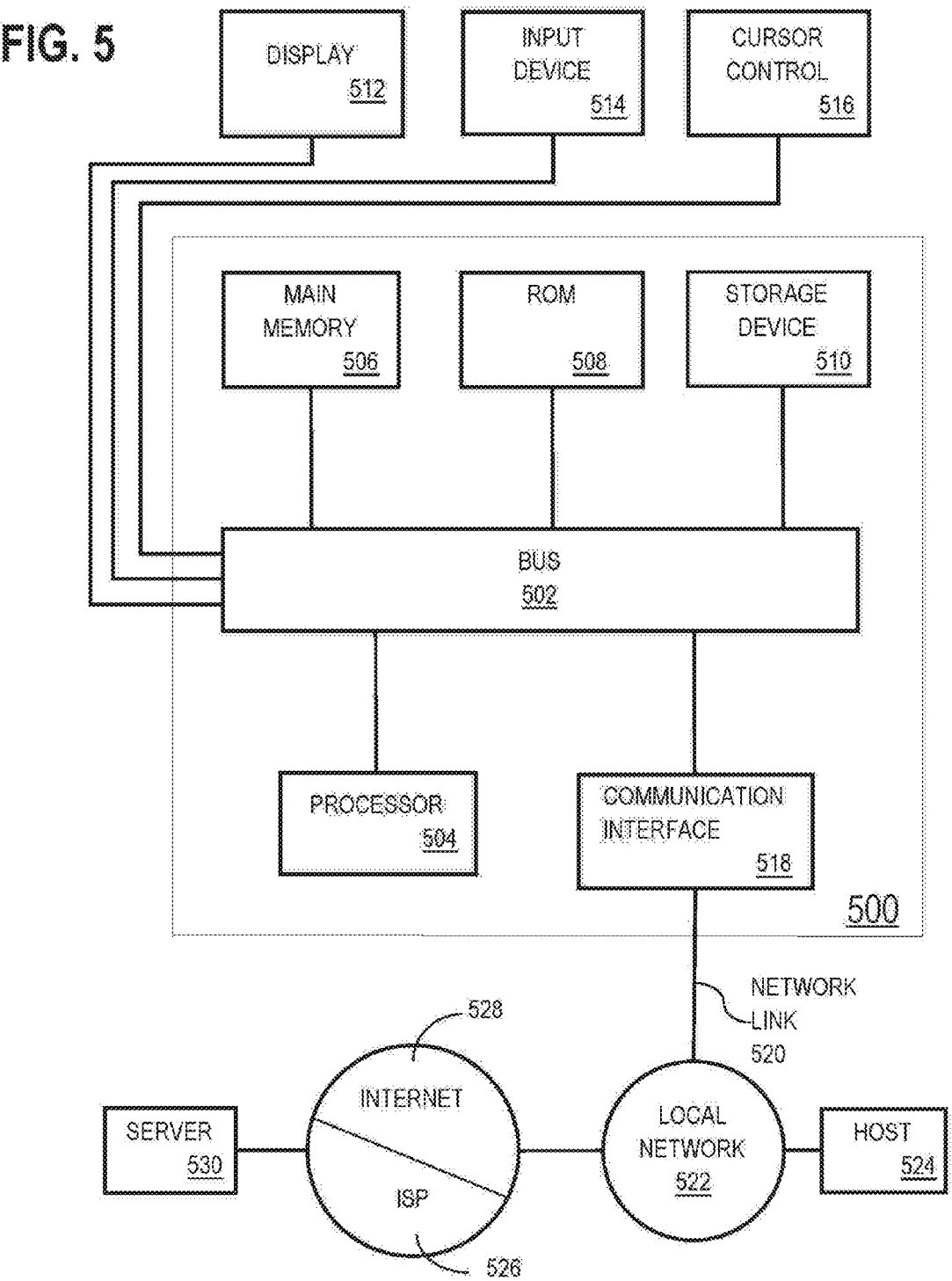
FIG. 5 illustrates a block diagram of a system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer-readable medium comprising instructions which, when executed by one or more hardware processors, causes performance of operations comprising:
    receiving, by an internal node in an Autonomous System (AS), a packet destined for an Internet address external to the AS;
    based on the Internet address: determining, by the internal node, an egress path to transmit the packet toward the Internet address;
    mapping the egress path to a billing counter of a plurality of billing counters;
    incrementing the billing counter in relation to transmission of the packet on the egress path; and
    transmitting the packet, by the internal node, toward an egress gateway of the AS on the egress path.

2. The medium of claim 1, wherein mapping the egress path to the billing counter comprises:
    mapping the egress path to a billing classification tag; and
    mapping the billing classification tag to the billing counter.

3. The medium of claim 2, wherein the operations further comprise:
    prior to receiving the packet:
        storing information mapping a plurality of billing classification tags to a plurality of billing counters.

4. The medium of claim 2, wherein the operations further comprise:
    prior to receiving the packet:
        storing information mapping each billing classification tag, of a plurality of billing classification tags, to at least one egress path.

5. The medium of claim 2, wherein the billing classification tag corresponds to a Border Gateway Protocol (BGP) community tag.

6. The medium of claim 2, wherein the operations further comprise receiving, from a logical peer outside of the AS, routing information comprising the egress path.

7. The medium of claim 1, wherein the packet is received by the internal node on a particular overlay network of a plurality of overlay networks, and wherein the mapping operation comprises mapping the egress path and the particular overlay network to the billing counter.

8. The medium of claim 7, wherein the particular overlay network and the billing counter correspond to a same tenant in a multi-tenant environment.

9. The medium of claim 1, wherein the operations further comprise:
    receiving, by a second node in the AS, a second packet destined for a second Internet address external to the AS;
    based on the second Internet address: determining, by the AS, a second egress path to transmit the second packet toward the second Internet address;
    mapping the second egress path to a billing classification tag;
    determining whether an existing billing counter corresponds to the billing classification tag;
    responsive to determining that no existing billing counter corresponds to the billing classification tag, generating a new billing counter corresponding to the billing classification tag;
    incrementing the new billing counter in relation to the transmission of the second packet on the second egress path; and
    transmitting the second packet on the second egress path.

10. The medium of claim 1, wherein mapping the egress path to the billing counter comprises:
    determining an encryption type associated with the egress path and mapping the encryption type to the billing counter.

11. The medium of claim 1, wherein the operations further comprise:
    for each particular billing counter of a set of billing counters (a) associated with a same tenant in the plurality of tenants and (b) maintained by a plurality of nodes in the AS:
        computing a subtotal corresponding to the particular billing counter based on a counter value associated with the billing counter, and a rate associated with the billing counter; and
        adding the subtotals for the set of billing counters to determine a total charge for the tenant.

12. The medium of claim 11, wherein computing and adding the subtotals is performed by a tabulation component in the AS.

13. The medium of claim 1, wherein the internal node is a redirector in the AS.

14. The medium of claim 1, wherein the egress path identifies at least one of: a customer router, an Internet backbone router, and a network service provider router.

15. The medium of claim 1, wherein the egress path comprises a Virtual Private Network (VPN) connection.

16. The medium of claim 1, wherein the billing counter is incremented based on a quality of service associated with the egress path.

17. The medium of claim 1, wherein the billing counter is incremented based on a number of bytes comprised in the packet.

18. The medium of claim 1,
    wherein mapping the egress path to the billing counter comprises:
        receiving, by an egress gateway in the AS from a logical peer outside of the AS, routing information comprising the egress path,
        mapping the egress path to a first billing classification tag, determining an encryption type associated with the egress path, and mapping the first billing classification tag and the encryption type to the billing counter;

wherein the operations further comprise:

receiving, by a second node in the AS, a second packet destined for a second Internet address external to the AS;

based on the second Internet address: determining, by the AS, a second egress path to transmit the second packet toward the second Internet address;

mapping the second egress path to a billing classification tag;

determining whether an existing billing counter corresponds to the billing classification tag;

responsive to determining that no existing billing counter corresponds to the billing classification tag, generating a new billing counter corresponding to the billing classification tag;

incrementing the new billing counter in relation to the transmission of the second packet on the second egress path; and transmitting the second packet on the second egress path;

wherein for each particular billing counter of a set of billing counters (a) associated with a same tenant in the plurality of tenants and (b) maintained by a plurality of nodes in the AS, the operations further comprise:

computing, by a tabulation component in the AS, a subtotal corresponding to the particular billing counter based on a counter value associated with the billing counter, and a rate associated with the billing counter;

adding, by the tabulation component in the AS, the subtotals for the set of billing counters to determine a total charge for the tenant;

wherein the first billing classification tag corresponds to a Border Gateway Protocol (BGP) community tag;

wherein the internal node is a redirector in the AS;

wherein the egress path identifies at least one of: a customer router, an Internet backbone router, a network service provider router, and a Virtual Private Network (VPN) connection; and wherein the billing counter is incremented based at least one of: on a quality of service associated with the egress path and a number of bytes comprised in the packet.

19. A method comprising:

receiving, by an internal node in an Autonomous System (AS), a packet destined for an Internet address external to the AS;

based on the Internet address: determining, by the internal node, an egress path to transmit the packet toward the Internet address;

mapping the egress path to a billing counter of a plurality of billing counters;

incrementing the billing counter in relation to transmission of the packet on the egress path; and transmitting the packet, by the internal node, toward an egress gateway of the AS on the egress path;

wherein the method is performed by at least one device including a hardware processor.

20. A system comprising:

at least one device including a hardware processor;

the system configured to perform operations comprising:

receiving, by an internal node in an Autonomous System (AS), a packet destined for an Internet address external to the AS;

based on the Internet address: determining, by the internal node, an egress path to transmit the packet toward the Internet address;

mapping the egress path to a billing counter of a plurality of billing counters;

incrementing the billing counter in relation to transmission of the packet on the egress path; and transmitting the packet, by the internal node via, toward an egress gateway of the AS on the egress path.

* * * * *